US007913164B1

(12) United States Patent
Svendsen

(10) Patent No.: US 7,913,164 B1
(45) Date of Patent: Mar. 22, 2011

(54) SERVING AN IMAGE IN MULTIPLE FORMATS FROM A PHOTOHOSTING WEBSITE

(75) Inventor: Hugh Svendsen, Chapel Hill, NC (US)

(73) Assignee: Quiro Holdings, Inc., Raleigh, NC (US)

( * ) Notice: Subject to any disclaimer, the term of this patent is extended or adjusted under 35 U.S.C. 154(b) by 1441 days.

(21) Appl. No.: 11/272,297

(22) Filed: Nov. 10, 2005

Related U.S. Application Data

(63) Continuation-in-part of application No. 10/405,416, filed on Apr. 2, 2003, now abandoned.

(51) Int. Cl.
*G06F 17/00* (2006.01)
(52) U.S. Cl. ........................................ 715/249; 715/200
(58) Field of Classification Search .................. 715/200, 715/249, 255
See application file for complete search history.

(56) References Cited

U.S. PATENT DOCUMENTS

| | | | | |
|---|---|---|---|---|
| 5,987,510 | A | * 11/1999 | Imai et al. | 709/219 |
| 6,421,429 | B1 | 7/2002 | Merritt et al. | 379/93.17 |
| 6,453,361 | B1 | 9/2002 | Morris | 709/250 |
| 6,522,782 | B2 | * 2/2003 | Pass et al. | 382/218 |
| 6,601,056 | B1 | * 7/2003 | Kagle et al. | 707/1 |
| 6,624,815 | B1 | 9/2003 | Morrish | 345/467 |
| 6,628,899 | B1 | 9/2003 | Kito | 396/56 |
| 6,965,450 | B2 | * 11/2005 | Sweetland et al. | 358/1.18 |
| 7,191,212 | B2 | * 3/2007 | Hirai | 709/203 |
| 7,391,526 | B2 | * 6/2008 | Nishimura | 358/1.15 |
| 7,453,606 | B2 | * 11/2008 | Maeda | 358/438 |
| 7,548,993 | B2 | * 6/2009 | Koguchi | 709/250 |
| 2003/0028543 | A1 | * 2/2003 | Dusberger | 707/100 |
| 2004/0073873 | A1 | 4/2004 | Croney et al. | 715/273 |
| 2004/0125130 | A1 | 7/2004 | Flamini et al. | 715/738 |
| 2005/0097445 | A1 | * 5/2005 | Day et al. | 715/501.1 |

OTHER PUBLICATIONS

Imagemagick, Imagemagick Users Guide, 2000, Imagemagick, pp. 1-490 in PDF format.*
Non-Final Office Action mailed Sep. 17, 2004 issued by the Patent Office during the prosecution of U.S. Appl. No. 10/405,416. Attached as Appendix A, 20 pages.
Final Office Action mailed May 10, 2005 issued by the Patent Office during the prosecution of U.S. Appl. No. 10/405,416. Attached as Appendix B, 24 pages.
Advisory Action mailed Jul. 26, 2005 issued by the Patent Office during the prosecution of U.S. Appl. No. 10/405,416. Attached as Appendix C, 4 pages.

* cited by examiner

*Primary Examiner* — Stephen S Hong
*Assistant Examiner* — Manglesh M Patel
(74) *Attorney, Agent, or Firm* — Withrow & Terranova, PLLC

(57) ABSTRACT

A method and system for serving an image in multiple formats from a photohosting site is disclosed. The method and system include storing a set of format parameters and respective parameter values in a configuration file. When a request for a modified image containing one or more of the formats is received, each of the format parameters are looked-up in the configuration file and the value corresponding to each of the format parameters is retrieved. A command line is then automatically generated in which the retrieved format values are used as command line options, and the command line is then interpreted to invoke image processing library calls to generate the modified image. The modified image is stored in a file system, and at least a portion of the command line option is used as an identifier for the modified image. In a further aspect of the present invention, the format parameters in the configuration file are also retrieved and displayed to the user on a web page for selection when the user is requesting a modified image from the photohosting site.

12 Claims, 9 Drawing Sheets

230

CreateNewImageType (URL) {

232 {
- string style = getservletparameter (style);
- string res = getservletparameter (resolution);
- string type = getservletparameter (type);
- string asset = getservletparameter (asset);

234 {
- string action = tablelookup (style) + tablelookup (resolution);
- string extension = getfileextension (tablelookup (type));

236 {
- string inputfilename = asset + ".jpg";
- string outputimageid = action + asset + extension;

238   string commandline = inputfilename + action + outputimageid ;

240   if filelocated (outputimageID), then
242       return (found image);
   else
244       invokecommandlinetool (commandline);

SERVING AN IMAGE IN MULTIPLE FORMATS FROM A PHOTOHOSTING WEBSITE

RELATED APPLICATIONS

This application is a Continuation-in-Part of the U.S. patent application Ser. No. 10/405,416, entitled SERVING AN IMAGE IN MULTIPLE FORMATS FROM A PHOTOHOSTING WEBSITE, filed Apr. 2, 2003, now abandoned, which is hereby incorporated herein by reference in its entirety.

FIELD OF THE INVENTION

The present invention relates to photohosting websites, and more particular to a method and system for serving an image in multiple formats from a photohosting website.

BACKGROUND OF THE INVENTION

The use of photohosting websites that allow users to upload digital images to a server on the Web for storage and display are becoming increasingly popular. Once a set of images have been uploaded to a photohosting site, the photohosting site typically displays the images in the form of an online photo album.

There are many reasons why it is preferable for photohosting sites to generate multiple versions of each uploaded image that may differ from the original in terms of resolution, file type, and style. For example, much smaller versions of the original images, referred to as thumbnails, are usually created for display in the online photo albums in order to increase the speed at which the photo albums may be displayed in the user's Web browser.

Given the storage requirements for storing many different versions of each image, many photohosting websites create the images dynamically, i.e., on demand, and store or cache those versions of the images that are requested most often.

The photohosting site has a server that is programmed to receive a request for a particular version of an image via standard Web protocols. The code on the server determines if the image has been previously generated, and if not generates the requested version image, and then returns the generated version of the image to the requester.

FIG. 1 is a block diagram illustrating a conventional photohosting system that can serve an image in multiple formats. The system 10 comprises a photohosting site server 12 that responds to requests made from a user's Web browser 14. The server 12 typically includes an image database 16 for storing original uploaded images, and a file system 18 for storing folders and files, including image files. Programs that implement the functionality of the server 12 may include a servlet 22 and an image processing library 20. The servlet 22 may typically include a URL parser 24, a file locator 26, and an image generator 28, which function as follows.

In operation, the Web browser 14 displays a web page 30 from the server 12 that may include a link 32 to the original image and a link 34 to a modified version of the original image. If the user clicks the link 32 to the original image, the Web browser 14 sends a URL (uniform resource locator) including the original image ID to the server 12, which will then retrieve the original image from the image database 16 or the file system 18 and return the image to the Web browser 14 for display.

If the user clicks the link 34 to modified image, then the Web browser 14 sends a URL with the image ID and a list of parameters (e.g., resolution, format, and style) specifying how the original image is to be modified. The servlet 22 on the server 12 receives the URL and passes it to the URL parser 24. The URL parser 24 parses the URL and strips the modification parameters from the URL. Using the image ID, the file locator 26 determines the location of the original image, e.g., in the image database 16 or somewhere in the file system 18. The image generator 28 determines if the original image has already been modified as requested by the URL and whether the modified image is stored in the file system 18. If the modified image is present in the file system 18, the modified image is returned to the Web browser 14.

If the modified image is not present in the file system 18, then code in the image generator 28 generates the modified image by using the URL parameters input from the URL parser 24 in calls to the image processing library 20. The image processing library 20 then performs the requested changes on the original image to create the modified image. The modified image is then stored in the file system 18.

The following illustrates a portion of code in the image generator 28 responsible for interpreting the URL parameters. For purposes of example, assume that the system receives the following exemplary URL:

http://serveraddress?file=AxD209&style=B.

As those with ordinary skill in the art will readily appreciate, the portion of code in the image generator 28 responsible for interpreting URL parameters may be hard coded as a common "switch" statement, or as a series of "If then" statements, as follows:

```
|
switch (style) {
   case 'A';
      |
      |
      break;
   case 'B';
      create new style (parameters);
      break;
   case 'C';
      |
      |
      break;
   |
   |
}
```

In this example, "style" is a parameter in the received URL above (style=B). Given the presence of this parameter, the switch statement is invoked and any image processing library 20 calls associated with the given "case" statement whose condition is true are invoked. In this example, since style=B from the URL, any image processing library 20 calls associated with the switch statement "case 'B'" are invoked.

Although the system 10 works well for its intended purpose, the system 10 requires an operator of the server 12 to write custom code for the image generator 28 that examines each URL parameter in order to make the image processing library calls. In order to add or change a parameter, the operator must open the source code, modify the source code, and then recompile the source code to create an executable object that can be executed by the server. This is not only a time-consuming process, but also requires software expertise.

Another disadvantage of the conventional system 10 is that if a URL is received having the same parameters as a previous URL, then the image generator 28 may consequently produce duplicate image formats and duplicate modified images. A further disadvantage of the conventional system 10 is that in signal processing, performing operations in a different order can produce different results. Therefore, when producing image formats, it is insufficient to only know that operations A and B, for example, were applied to an image; it is also necessary to know and what order the operations were performed.

Accordingly, there is a need for an improved method and system for serving multiple image formats in which different image formats may easily be added to the system. The method and system should not need to recompile source code when formats are added or modified, the method and system should reduce the chances that duplicate image formats will be created, and the method and system should preserve the order of operations involved in each of the image formats.

SUMMARY OF THE INVENTION

The present invention provides a method and system for serving an image in multiple formats from a photohosting site. The method and system include storing a set of format parameters and respective parameter values in a configuration file. When a request for a modified image containing one or more of the formats is received, each of the format parameters are looked-up in the configuration file and the value corresponding to each of the format parameters is retrieved. A command line is then programmatically generated in which the retrieved format values are used as command line options, and the command line is then interpreted to invoke image processing library calls to generate the modified image. The modified image is stored in a file system, and at least a portion of the command line option is used as an identifier for the modified image. In a further aspect of the present invention, the format parameters in the configuration file are also retrieved and displayed to the user on a web page for selection when the user is requesting a modified image from the photohosting site.

According to the method and system disclosed herein, by storing format parameter and value pairs in the configuration file, and using the parameter values as command line options when programmatically invoking a command line tool to perform image processing calls, eliminates the need to add custom code to the source code for each new or modified format parameter, and therefore eliminates the need to recompile the source code. Because the parameters extracted from URL are used to create command lines, a portion of which are used for image identifiers (e.g., file names), the method and system reduces the chances that duplicate image formats and image names will be created. In addition, the use of the command line options as the image identifiers preserves the order of operations involved in each of the image formats created by the command line options.

DESCRIPTION OF THE DRAWINGS

FIG. 8 is a block diagram illustrating a portion of code executed by the server for converting the URL request into the command line.

DETAILED DESCRIPTION

The present invention relates to serving an image in multiple formats from a photohosting site. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides a method and system for serving an uploaded image in multiple image formats from a photohosting site. The present invention allows an operator to create a configuration file containing various format parameters using a text editor, and integrates a command line tool into the photohosting site for automatically performing image processing library calls. According to the exemplary embodiment, the format parameters from the configuration file are used during generation of a command line as command line options in response to receiving a request for a modified image from a user. Once the command line is generated, the command line tool is automatically invoked to convert the command line options into image processing library calls to generate the modified images. Use of the configuration file and integration of the command line tool enables new format parameters and values to be added to the system to provide users of the system more options when ordering modified images, eliminating the need to modify and recompile source code for each newly added format parameter.

Figure 1:
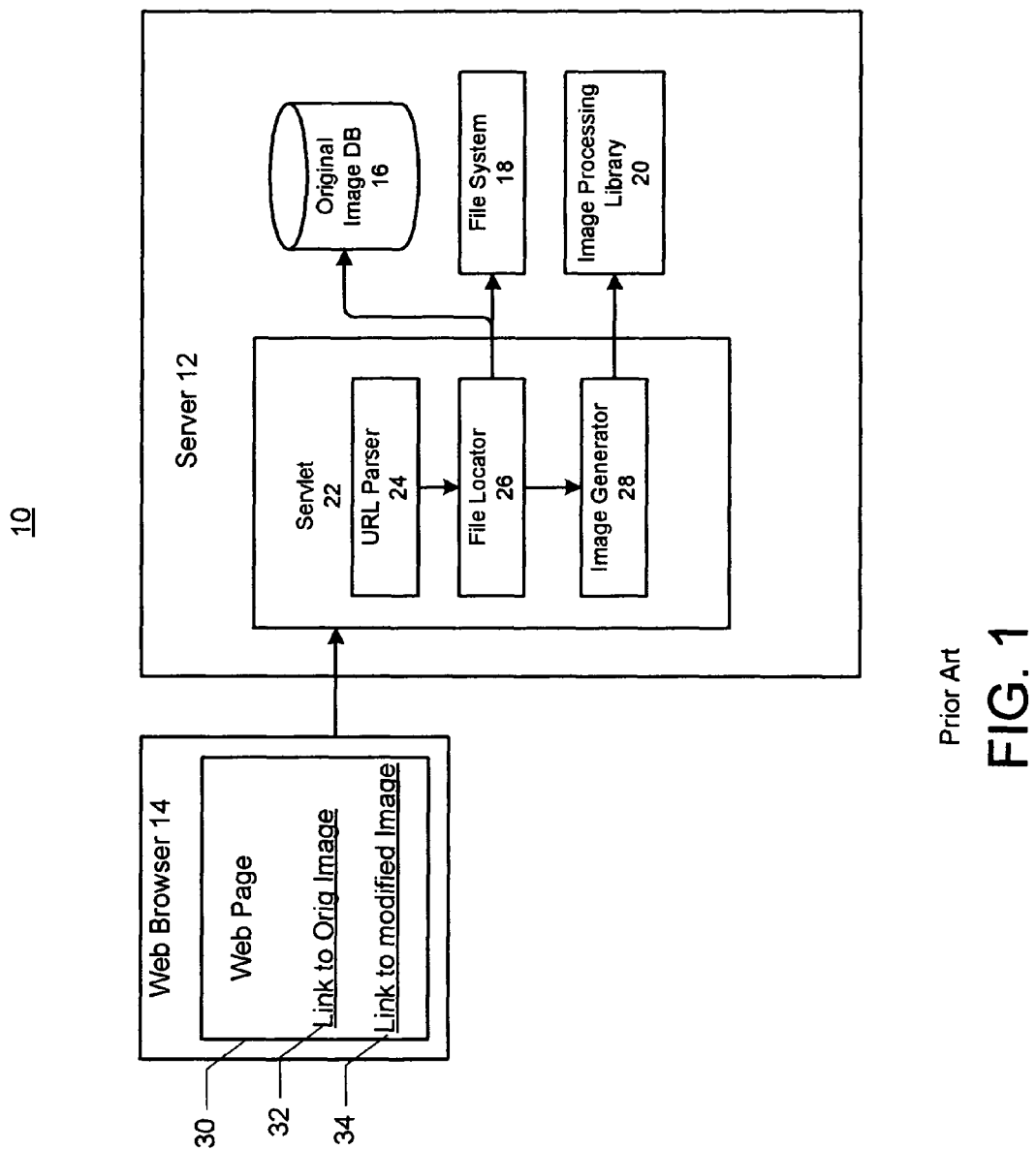
FIG. 1 is a block diagram illustrating a conventional photohosting system that can serve an image in multiple formats.
Figure 2:
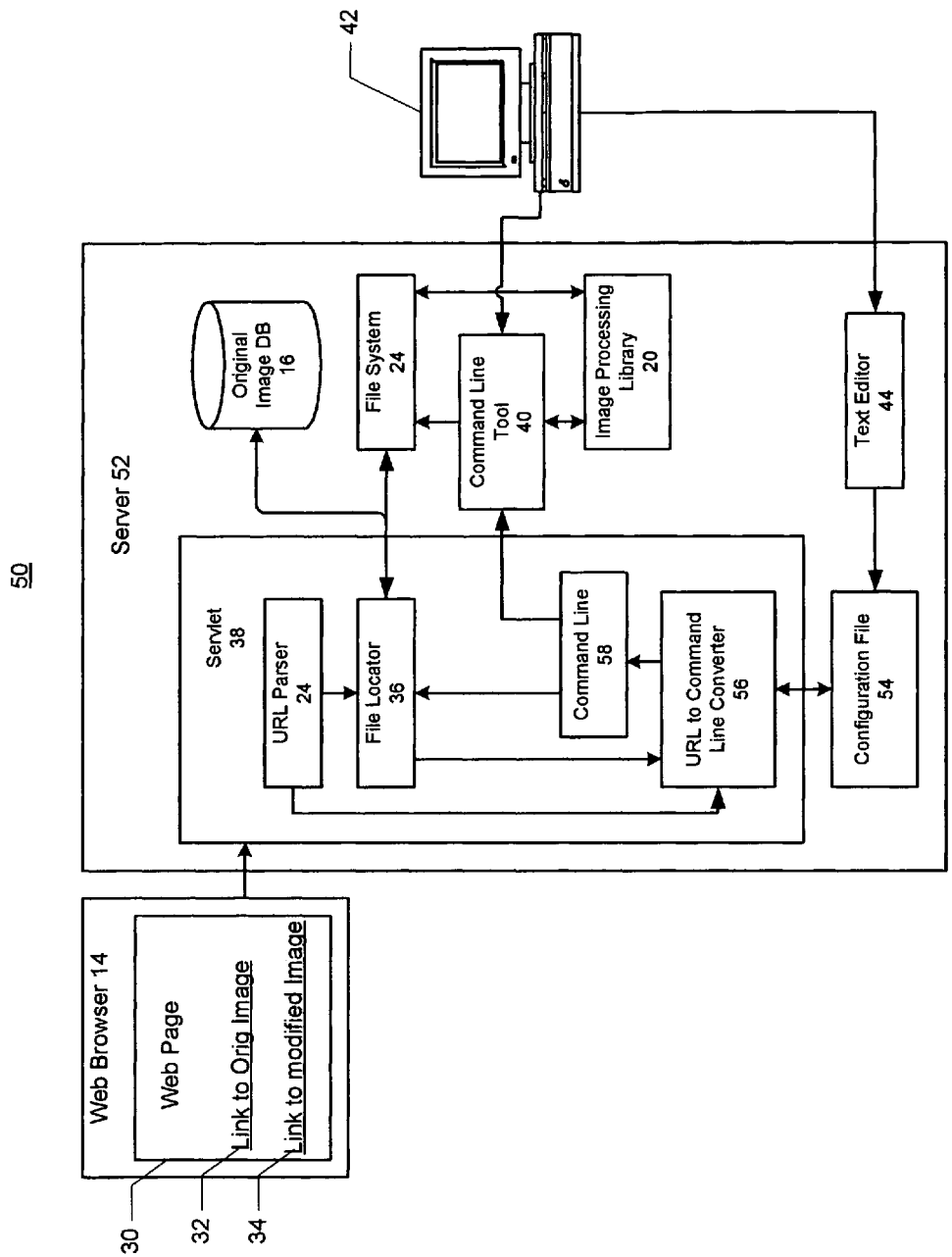
FIG. 2 is a block diagram of a photohosting system that can serve images in multiple formats according to a preferred embodiment of the present invention.

FIG. 2 is a block diagram of a photohosting system 50 that can serve images in multiple formats according to a preferred embodiment of the present invention. The components of the server 52 that may be similar to those of FIG. 1 include the image data base 16 for storing original uploaded images, the file system 18, the URL parser 24, and the image processing library 20.

According to the exemplary embodiment, the server 52 further includes a modified file locator 36, a configuration file 54, a URL-to-command-line-converter 56 for automatically generating a command line 58, and a command line tool 40 for interpreting the command line 58. The command line tool 40 is a program comprising utilities to create, edit, and convert images by converting commands and options specified in the command line 58 into image processing library 20 calls. The image processing library 20 processes command line options in the order they appear in the command 58. An example of a commercially available command line tool is IMAGEMAGICK by IMAGEMAGICK STUDIO, LLC.

The system further includes computer 42 and a text editor 44. An operator typically uses the computer 42 to interact with command line tool 40 and to manually create a modified image by manually entering command lines and command line options. The text editor 44 may comprise any word processor, spreadsheet, or presentation program that enables a user to enter text into a file.

According to the preferred embodiment, a nonprogrammer operator of the computer 42 may use the text editor 44 to create and edit the configuration file 54, which contains a set of image format parameters and respective parameter values. In response to a user interacting with the server 52 to request a modified image via Web browser 14, the server 52 accesses the configuration file 54 to display at least a portion of the format parameters to the user. The server 52 then receives a URL request for a modified image, wherein the URL request contains at least one of the first format parameters selected by the user.

According to the preferred embodiment, the URL request is converted into image processing library 20 calls via the automatic generation of command lines 58 as follows. First, the URL parser 24 parses the URL to retrieve the format parameters. The URL-to-command-line-converter 56 looks up each format parameter in the in the configuration file 54 and the parameter's corresponding parameter value is retrieved. The URL-to-command-line-converter 56 then automatically generates the command line 58 in which the parameter values are used as a command line option. The command line tool 40 is automatically invoked, which interprets the command line 58 to make the image processing library calls to generate a modified image. According to a further embodiment, at least a portion of the command line option is also used as an identifier for the modified image in the file system.

According to the method and system disclosed herein, allowing an operator to create a configuration file 54 using text editor 44 and the integration of the command line tool 40 into a photohosting system 50 for automatically performing customized image processing library calls using the format parameters from the configuration file 54 enables a nonprogrammer to enter new format parameters and values into the configuration file 54 to provide users of the server 52 more options when ordering modified images. Thus, the configuration file 54 eliminates the need for a programmer to modify and recompile source code for each newly added format parameter.

Figure 3:
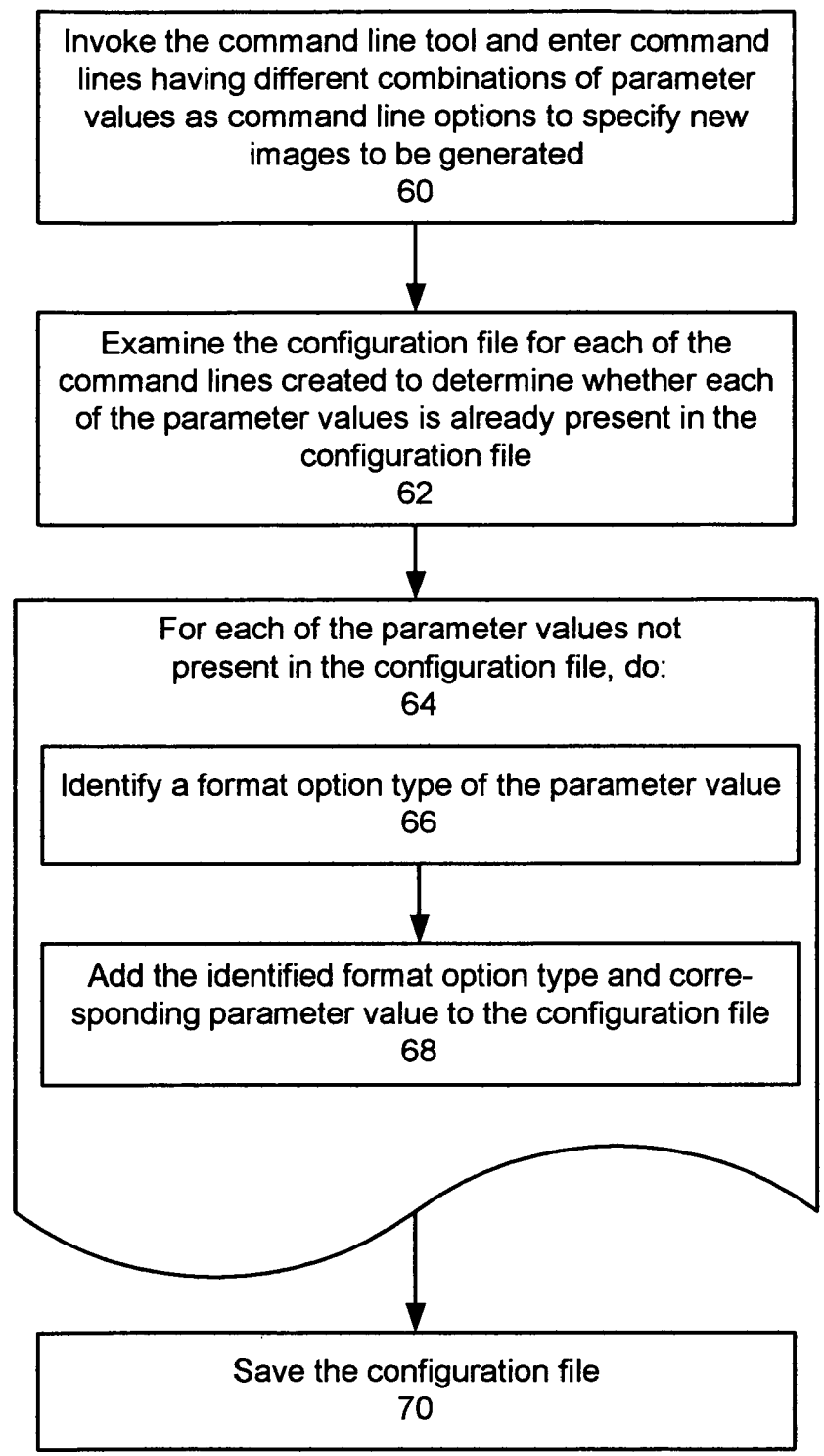
FIG. 3 is a flow diagram illustrating the process performed by an operator for creating and modifying the configuration file.

FIG. 3 is a flow diagram illustrating the process performed by an operator for creating and modifying the configuration file 54. In a preferred embodiment, the process is described in the context of the operator using computer 42 and command line tool 40 to create new types of modified images. In an alternative embodiment, a software program may be substituted for the operator in the steps below to provide an automated process for generating the configuration file 54.

The process begins in step 60 in which an operator, preferably a nonprogrammer, or software program invokes the command line tool 40, and repeatedly enters command lines having different combinations of parameter values as command line options to specify new images to be generated. In step 62, the configuration file 54 is examined for each of the created command lines to determine whether each of the parameter values is already present in the configuration file 54. In step 64, for each of the parameter values not present in the configuration file 54, steps 66 and 68 are performed. In step 66, a format option type of the parameter value is identified. The format option type preferably includes a style, a file type, and a resolution, as described below. In step 68, the identified format option type and corresponding parameter value are added to the configuration file 54. Finally, in step 69, the configuration file 54 is saved. In the case where the operator is creating or modifying the configuration file 54, then the operator may use the text editor 44 to add entries and save the configuration file 54.

Figure 4:
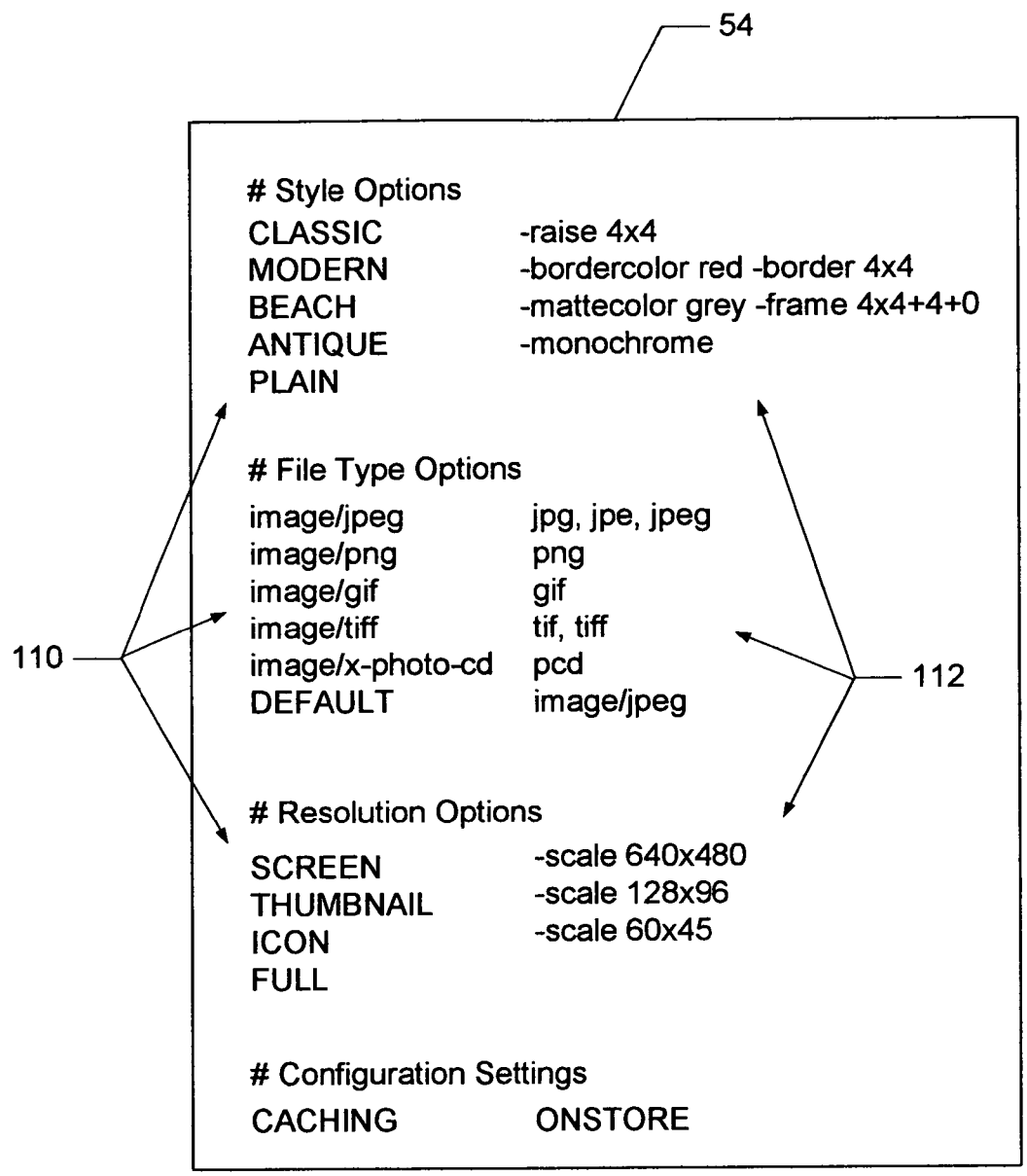
FIG. 4 is a diagram illustrating an example configuration file.

FIG. 4 is a diagram illustrating an example configuration file 54. In a preferred embodiment, the configuration file 54 stores a set of format parameters 110 and their respective values 112, where the format parameters 110 may be grouped by format option type. As described above, examples of different format options include style, file type, and resolution. Each type of style applies a border/frame or effect to the image. Examples styles include Classic, Modern, Beach, Antique, and Plain. The file type option allows a user to specify a standard, Web-displayable file type for the modified image. Examples of well-known file types include JPEG, PNG, TIFF, GIF, and PhotoCD. In a preferred embodiment the default file type is JPEG. The resolution option allows a user to specify the size of the modified image. Example parameters for the resolution option include Screen, Thumbnail, Icons, and Full.

The configuration file 54 may also include configuration settings that have a caching option that specifies when the modified image will be generated. The caching option may have three possible values: onstore, background, and on request. Onstore means that all specified resolutions would be generated at the time the original image is uploaded. Background means that the specified resolutions will be generated when the server is idle. And on request means that the specified resolutions will be generated upon request.

Figure 5A:
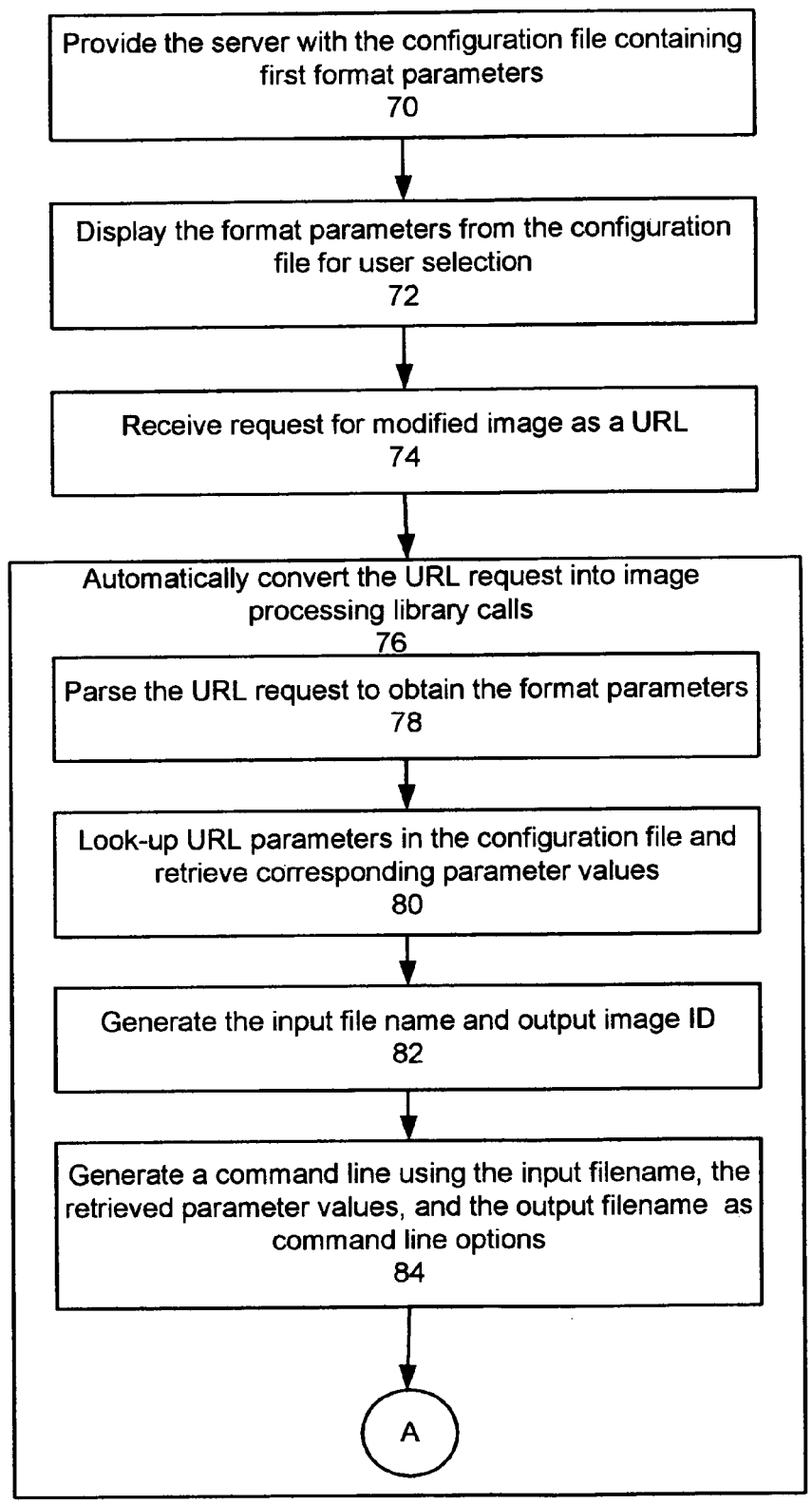
FIGS. 5A and 5B are a flow chart illustrating the process performed by the server 52 for serving multiple formats of an image.
Figure 5B:
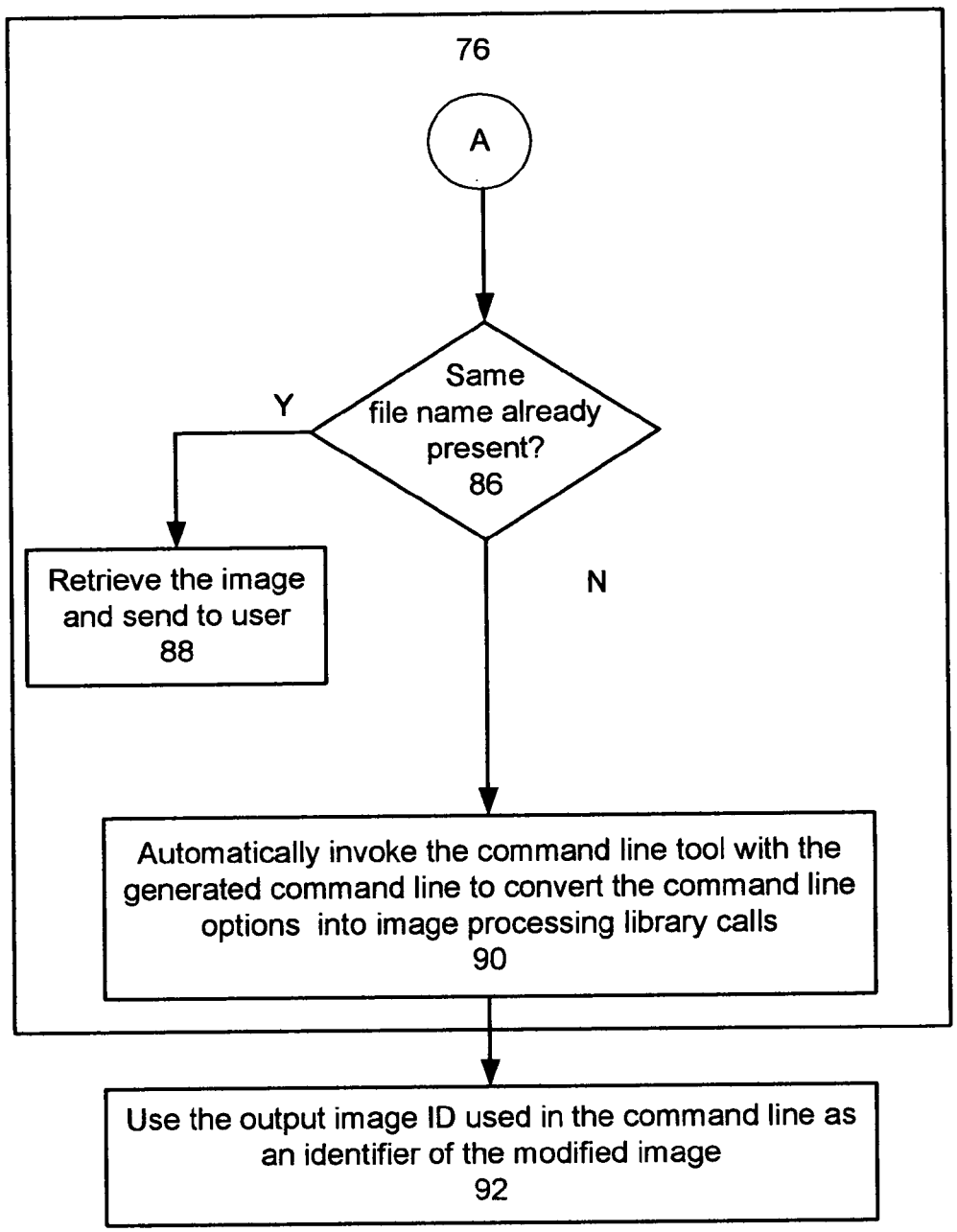

FIGS. 5A and 5B are a flow chart illustrating the process performed by the server 52 for serving multiple formats of an image. The process begins in step 70 in which the server 52 is provided with the configuration file 54 containing format parameters, where each of the format parameters includes a format option type and parameter value pair.

In response to a user interacting with the server 52 to request a modified image, such as when attempting to build an online album, the server 52 accesses the configuration file 54 in step 72 to display at least a portion of the format parameters therein on a web page for user selection.

Figure 6:
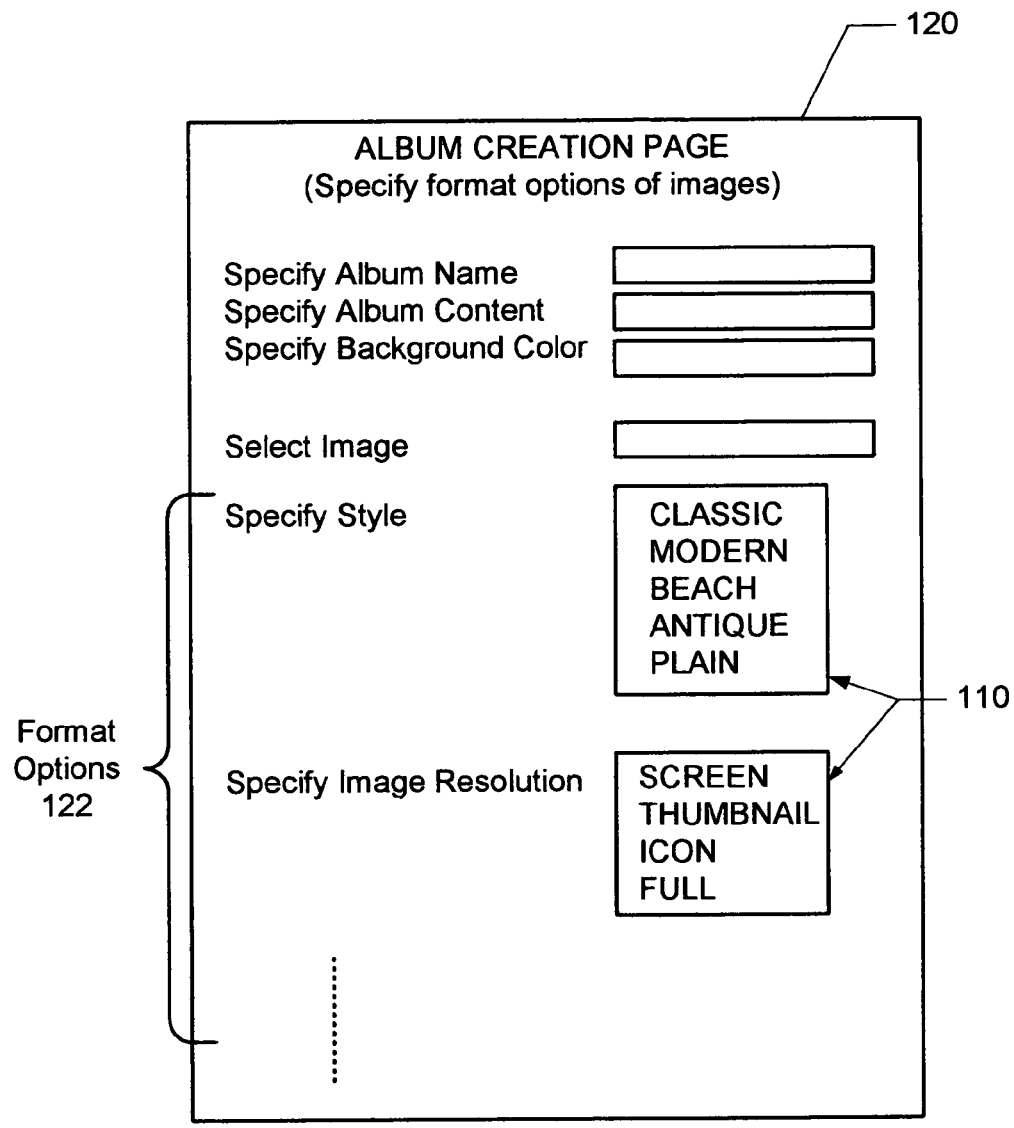
FIG. 6 is a block diagram illustrating an example web page displayed for the user for building an online album with modified images.

FIG. 6 is a block diagram illustrating an example web page displayed for the user for building an online album with modified images. As shown, the web page 120 allows the user to specify the name, content, and background color for the album, and for each selected image to be included in the album, displays the format options 122 that can be applied to the image. In a preferred embodiment, the parameters for each format option 122 are displayed to the user in pull down lists. For example, to specify an image resolution for the image, the user may select Thumbnail, Screennail, Icon, Full, and User-defined, which are the resolution parameters 110 from the configuration file 54.

Referring again, to FIG. 5A, when the user is finished selecting format options 122 for the modified image, the Web browser 14 submits the request containing the format parameters over a network to the server 52, and in step 74 the servlet 22 receives the request. In a preferred embodiment, the request comprises a universal resource locator (URL) that includes a server ID, an image ID, and the format parameters 110 selected by the user.

Figure 7:
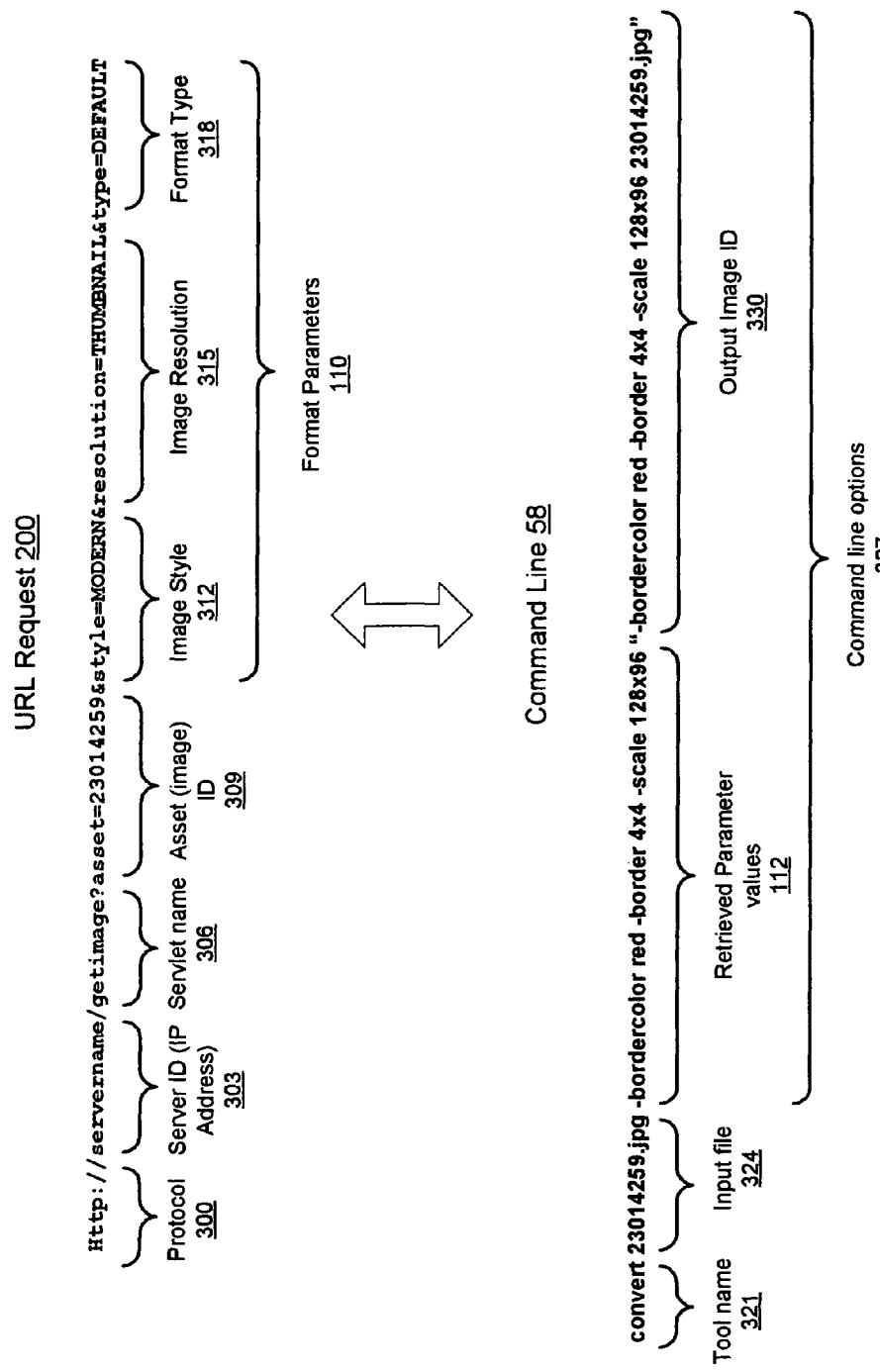
FIG. 7 is a diagram showing an example format and content of a URL request.

FIG. 7 is a diagram showing an example format and content of a URL request 200. The URL request 200 includes the following fields: a protocol 300, a server IP address 303, a servlet ID 306 (e.g., IP address), an asset ID 309 (e.g., image name), an image style 312, an image resolution 315, and format type 318. The format parameters 110 selected by the user comprise the image style 312, the image resolution 315, and the format type 318. In this example, the asset ID 309 includes a format parameter called "asset" whose value is "2314259." The image style 312 includes a format parameter called "style" whose value is "MODERN." The image resolution 315 includes a format parameter called "resolution" whose value is "THUMBNAIL." The format type 318 includes a format parameter called "type" whose value is "DEFAULT."

Referring to both FIGS. 5A and 7, after receiving the URL request 200, the URL request 200 is automatically converted into image processing library 20 calls to create the modified image in step 76. More specifically, the servlet 38 and the URL-to-command-line-converter 56 convert the URL request 200 into a command line 58. This conversion of the URL request 200 into a command line 58 is illustrated by the arrow in FIG. 7. According to the exemplary embodiment, the command line 58 includes a tool name 321, an input file name 324, parameter values 112 retrieved from the configuration file 54, and an output image ID 330 of a modified image. To retrieve parameter values 112 and the output image ID 330 comprise command line options 327.

FIG. 8 is a block diagram illustrating a pseudo code representation of the algorithm executed by the server 52 for converting the URL request 200 into the command line 58. The code is preferably implemented in the servlet 22 and comprises a routine referred to here as "CreateNewImageType" 230, whose input is the URL request 200. The instructions comprising the CreateNewImageType routine 230 are described below.

Referring to FIG. 5A, the process of converting the URL request 200 into the command line 58 begins in step 78 by the URL parser 24 parsing the URL request 200 to retrieve the format parameters 110. In a preferred embodiment, the format parameters retrieved from the URL request 200 include the asset ID 309, the image style 312, the image resolution 315, and the format type 318. Referring to FIG. 8, the indication of the URL parser 24 is implemented via instructions 232 of the CreateNewImageType routine 230, which are calls to routines in the URL parser 24.

Referring to FIG. 5A, in step 80, the URL parser 24 passes the format parameters 110 retrieved from the URL request 200 to the URL-to-command-line-converter 56, which looks up each parameter 110 in the configuration file 54 and retrieves the corresponding parameter values. The output file extension is also read based on the format type. These steps are implemented via instructions 234 in CreateNewImageType routine 230 of FIG. 8.

In step 82, the URL-to-command-line-converter 56 generates an input file name 324 and an output image ID 330. In an exemplary embodiment, the input file name 324 is based on the asset ID 309 passed in the URL 200, and the output image ID 330 is based on the parameter values 112 retrieved from the configuration file 54 and the input file name 324. These steps are implemented via instructions 236 in CreateNewImageType routine 230 of FIG. 8.

In step 84, the URL-to-command-line-converter 56 automatically generates the command line 58 that includes the retrieved parameter values 112 and the output image ID 330 of the image to be modified as command line options 327. These steps are implemented via instruction 238 in CreateNewImageType routine 230 of FIG. 8.

Referring now to FIG. 5B, the URL-to-command-line-converter 56 passes the command line 58 to the file locator 36, and in step 86, the file locator 36 searches the file system of 24 based on the image identifier 330 to determine if the modified image has previously been generated. If so, then in step 88 the modified image is retrieved from the file system 18 and sent to the Web browser 14. This corresponds to instructions 240 and 242 of the CreateNewImageType routine 230 in FIG. 8.

If the file locator 26 does not find image file with the same the output image ID 330 in the file system 24, then in step 90 the command line tool 40 is invoked with the generated command line 58 to convert the command line options 327 into image processing library 20 calls. This corresponds to instruction 244 of the CreateNewImageType routine 230 in FIG. 8.

In response, the image processing library 20 performs image processing operations such as scaling, type conversion, rotation, and so on, and in step 92 stores the modified image in the file system 18 and/or a temporary database using the output image ID 330 as the identifier of the modified image.

According to the preferred embodiment, the format parameters stored and retrieved from the configuration files 54 the configuration file 54 are used in several ways. First, the format parameters are retrieved by the server 52 to display available image formats to users requesting modified images. Second, the format parameters are used as a lookup table to retrieve the corresponding format values for use as command line options during the processing of user requests for modified image. And third, the format parameters in the command line option are used as the name (or other identifier) of the modified image. The next time a request is received for that particular modified image, the server 52 constructs the file name and searches the file system 18 for the filename before generating the image.

The use of the configuration file 54 and automatic command line generation to make calls to the image processing library 20 eliminates the need for custom code by the server 52. Consequently, no software in the system 50 needs to be recompiled when image formats are added. Instead, new image formats may be added to the system 50 by merely making changes to the configuration file 54 with a text editor 44. Therefore, the system 50 of the present invention is more flexible and easier to maintain for the photohosting site.

The system 50 of the present invention offers other advantages as well. For example, the syntax for the automatically generated command line options for the creation of modified images is reused in naming the modified image files. As a result, it is easy for the operator to look at a directory listing of the names of the modified image files that have been produced, and immediately know what formats are already available. Because of this, the system 50 also greatly reduces chances that duplicate image formats will be added. In conventional image systems it is possible to have a set of format parameters that when recombined produce modified images that are already present. Consequently, the system can produce different modified images having different image names, but contain the same modified image, which is redundant. Using the command line options that produced the modified image in the image name itself as in the present invention immediately indicates whether two instances the same images have been generated. This name scheme also preserves the order that the image processing operation were performed when generating the modified image, which is important because performing a set of image processing operations in if a different order can produce differing results. Therefore, it is not enough to only know that operations A & B were applied to an image, it is also necessary to know in what order the operations will be performed. Since the order of the image processing operations is recorded in the actual file name, this information is retained in a very visible way.

The method of storing the image processing operation information in the image name is also very portable. The same information could be recorded in a database or in another companion file with a different extension, but both options require two separate items to keep track of and maintain. The information could be recorded inside each image file, but not all file formats allow for this. By using the command line options in the file name of the image, any number of standard file formats may be used, and a record of the steps applied to produce the format is preserved without the use of a database. Storing the order of image processing operations in the file name as in the present invention is acceptable, portable, and readily visible.

In accordance with further embodiments of the present invention, a computer readable medium containing program instructions for serving multiple image formats is disclosed. In this embodiment, the program instructions provide a server with a configuration file containing first format parameters where each of the first format parameters includes a format option type and a parameter value pair. The program instructions also access the configuration file to display at least a portion of the format parameters to the user in response to a user interacting with the server over a network to request a modified image. In addition, the program instructions receive a request for a modified image over the network, wherein the request includes at least one of the first format parameters selected by the user. Furthermore, the program instructions convert the request into image processing calls in order to create the modified image. The request is converted into image processing cells by looking-up the at least one format parameter in the configuration file and retrieving the corresponding parameter value. Moreover, the program instructions automatically generate a command line in which the parameter value is used as a command line option and automatically invoke the command line tool with the generated command line and command line option, thereby invoking the image processing library calls to generate the modified image. The program instructions allow the operator to access the server and enter additional format parameters into the configuration file to provide users of the server more options when requesting modified images. According to an embodiment of the present invention, by allowing the operator to add new format parameters to the configuration file and use the configuration file for automatic generation of command lines, the need to modify and compile source code to generate an image processing library call for each newly added format parameter is eliminated.

A method and system for serving an image in multiple formats has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A method for serving multiple image formats, comprising:
   providing a server with a configuration file having first format parameters, each of the first format parameters includes a format option type and parameter value pair;
   receiving a request for a modified image over a network, wherein the request includes at least one of the first format parameters selected by a user;
   converting the request into image processing calls to create the modified image by,
      automatically looking up the at least one format parameter in the configuration file and retrieving a corresponding parameter value;
      automatically generating a command line in which the parameter value is used as a command line option;
      automatically invoking a command line tool with the generated command line and command line option, thereby invoking the image processing calls to generate the modified image; and
   allowing an operator to access the server and enter additional format parameters into the configuration file to provide users of the server more format options when requesting modified images, whereby allowing the operator to add new format parameters to the configuration file and use of the configuration file for automatic generation of command lines eliminates a need to modify and compile source code to generate an image processing library call for each newly added format parameter.

2. The method of claim 1 further including:
   storing the modified image in a file system; and
   using at least a portion of the command line option as an identifier in the file system for the modified image.

3. The method of claim 1 wherein the configuration file is created by the operator by,
   invoking the command line tool and entering at least one command line that is capable of invoking image processing library calls, wherein the at least one command line is provided with a first command line option that includes at least one parameter value to specify how an image processing library call should produce the modified image;
   for each command line created, determining whether a parameter value is present in the configuration file;
   for each of the parameter values not present in the configuration file,
      identifying a format option type of the parameter value not present, wherein the format option type includes at least one of a style, a file type, and a resolution, and
      adding the identified format option type and corresponding parameter value to the configuration file using a text editor; and
      saving the configuration file.

4. The method of claim 1 further comprising accessing the configuration file to display at least a portion of the format parameters to the user in response to the user interacting with the server over a network to request the modified image.

5. The method of claim 1 wherein providing the server with the configuration file further comprises grouping the format parameters in the configuration file by format option types.

6. The method of claim 5 wherein providing the server with the configuration file further comprises including style, file type, and resolution as the format option types.

7. The method of claim 1 wherein providing the server with the configuration file further comprises providing the configuration file with caching options that specify when the modified image will be generated, the caching options including any combination of generating the modified image at a time when an original image is uploaded, generating the modified image when the server is idle, and generating the modified image upon request.

8. The method of claim 1 wherein receiving the request for the modified image further comprises receiving the request from a web browser as a Uniform Resource Locator (URL) that includes a server identification (ID), an image ID, and the first format parameters selected by the user.

9. The method of claim 2 wherein prior to automatically invoking the command line tool with the generated command line, determining if the modified image having a matching identifier has previously been generated, and if so, retrieving the modified image and sending the modified image to requestor requester.

10. A non-transitory computer readable medium containing program instructions for serving multiple image formats, the program instructions for:
  providing a server with a configuration file including first format parameters, each of the first format parameters includes a format option type and parameter value pair;
  accessing the configuration file to display at least a portion of the first format parameters to a user in response to the user interacting with the server over a network to request a modified image;
  receiving a request for the modified image over the network, wherein the request includes at least one of the first format parameters selected by the user;
  converting the request into image processing library calls to create the modified image by,
    looking up the at least one format parameter in the configuration file and retrieving a corresponding parameter value;
    automatically generating a command line in which the parameter value is used as a command line option;
    automatically invoking a command line tool with the generated command line and command line option, thereby invoking the image processing library calls to generate the modified image; and <allowing an operator to access the server and enter additional format parameters into the configuration file to provide users of the server more format options when requesting modified images, whereby allowing the operator to add new format parameters to the configuration file and use the configuration file for automatic generation of the command lines eliminates a need to modify and compile source code to generate the image processing library calls for each newly added format parameter.

11. A method for serving multiple image formats, comprising:
  providing a server with a configuration file containing a set of format parameters and respective parameter values;
  receiving by the server a request for a modified image, wherein the request includes a first format parameter of the set of format parameters selected by a user;
  automatically converting the request into a command line by,
    looking up the first format parameter in the configuration file and retrieving the corresponding parameter value, and
    automatically generating the command line in which the parameter value is used as a command line option;
  automatically invoking a command line tool using the generated command line, which interprets the command line and converts the command line option into image processing library calls to generate the modified image;
  using at least part of the command line option as an identifier in a file system for the modified image; and
  allowing an operator to access the server and enter additional format parameters into the configuration file to provide users of the server more format options when requesting modified images, whereby allowing the operator to add new format parameters to the configuration file and use of the configuration file for automatic generation of command lines eliminates a need to modify and compile source code to generate an image processing library call for each newly added format parameter.

12. A server for serving multiple image formats in response to requests made from a browser, comprising:
  a configuration file for storing a plurality of format parameters and corresponding parameter values, wherein the server displays at least one of the plurality of format parameters from the configuration file on a web page for user selection when a user interacts with the server to request a modified image;
  a servlet for receiving a request for the modified image from the user over a network, wherein the request contains at least one of the plurality of format parameters selected by the user;
  a request-to-command-line converter in communication with the servlet for,
    looking up the at least one of the plurality of format parameters from the request in the configuration file and retrieving the corresponding parameter value;
    automatically generating a command line in which the corresponding parameter value is used as a command line option;
  a command line tool in communication with the servlet, wherein the command line tool is automatically invoked with the generated command line to convert the command line option into image processing library calls to generate the modified image; and
  a computer having a text editor for allowing an operator to add format parameters corresponding to second parameter values into the configuration file to provide users of the server more format options when ordering modified images, whereby allowing the operator to add new format parameters to the configuration file for automatic generation of command lines eliminates a need to add custom code to generate an image processing library call for each newly added format parameter.

* * * * *

UNITED STATES PATENT AND TRADEMARK OFFICE
CERTIFICATE OF CORRECTION

| | | |
|---|---|---|
| PATENT NO. | : 7,913,164 B1 | Page 1 of 1 |
| APPLICATION NO. | : 11/272297 | |
| DATED | : March 22, 2011 | |
| INVENTOR(S) | : Hugh Svendsen | |

It is certified that error appears in the above-identified patent and that said Letters Patent is hereby corrected as shown below:

On the title page item [73] change the Assignee's name from "Quiro" to --Qurio--.

Signed and Sealed this
Twenty-seventh Day of September, 2011

David J. Kappos
*Director of the United States Patent and Trademark Office*